US007182795B2

(12) United States Patent
Henly et al.

(10) Patent No.: US 7,182,795 B2
(45) Date of Patent: Feb. 27, 2007

(54) FUEL LUBRICITY ADDITIVES DERIVED FROM HYDROCARBYL SUCCINIC ANHYDRIDES AND HYDROXY AMINES, AND MIDDLE DISTILLATE FUELS CONTAINING SAME

(75) Inventors: Timothy J. Henly, Maidens, VA (US); John T. Loper, Richmond, VA (US); Scott D. Schwab, Richmond, VA (US)

(73) Assignee: Atton Chemical Intangibles LLC, Richmond, VA (US)

( * ) Notice: Subject to any disclaimer, the term of this patent is extended or adjusted under 35 U.S.C. 154(b) by 630 days.

(21) Appl. No.: 10/096,538

(22) Filed: Mar. 13, 2002

(65) Prior Publication Data

US 2003/0172584 A1    Sep. 18, 2003

(51) Int. Cl.
*C10L 1/18* (2006.01)
*C10L 1/22* (2006.01)
(52) U.S. Cl. ............................. 44/331; 44/341; 44/347
(58) Field of Classification Search .................. 44/347, 44/341, 331
See application file for complete search history.

(56) References Cited

U.S. PATENT DOCUMENTS

| 3,087,936 | A |   | 4/1963  | LeSuer           |
| 3,163,603 | A |   | 12/1964 | Le Suer          |
| 3,172,892 | A |   | 3/1965  | Le Suer et al.   |
| 3,219,666 | A |   | 11/1965 | Norman et al.    |
| 3,272,746 | A |   | 9/1966  | Le Suer et al.   |
| 3,306,907 | A |   | 2/1967  | McNinch et al.   |
| 3,324,033 | A |   | 6/1967  | Knapp            |
| 3,346,354 | A |   | 10/1967 | Kautsky et al.   |
| 3,361,673 | A |   | 1/1968  | Stuart et al.    |
| 3,364,001 | A |   | 1/1968  | Drummond et al.  |
| 3,676,089 | A |   | 7/1972  | Morris et al.    |
| 3,879,306 | A |   | 4/1975  | Kablaoui et al.  |
| 4,049,564 | A | * | 9/1977  | Ryer et al. .................. 508/221 |
| 4,097,389 | A |   | 6/1978  | Andress, Jr.     |
| 4,234,435 | A |   | 11/1980 | Meinhardt et al. |
| 4,253,876 | A |   | 3/1981  | Godar et al.     |
| 4,325,827 | A |   | 4/1982  | Papay et al.     |
| 4,420,407 | A |   | 12/1983 | Sung et al.      |
| 4,486,573 | A |   | 12/1984 | Hayashi          |
| 4,489,194 | A |   | 12/1984 | Hayashi          |
| 4,557,846 | A |   | 12/1985 | Wisotsky         |
| 4,997,456 | A |   | 3/1991  | Malfer           |
| 5,122,216 | A |   | 6/1992  | Goodwin, III     |
| 5,194,068 | A |   | 3/1993  | Mohr et al.      |
| 5,330,662 | A | * | 7/1994  | Jahnke et al. ................ 507/244 |
| 5,393,309 | A |   | 2/1995  | Cherpeck         |
| 5,588,973 | A | * | 12/1996 | Blackborow et al. ......... 44/347 |
| 5,620,486 | A |   | 4/1997  | Cherpeck         |
| 5,620,946 | A |   | 4/1997  | Jahnke et al.    |
| 5,772,705 | A | * | 6/1998  | Caprotti ...................... 44/389 |
| 6,001,141 | A |   | 12/1999 | Quigley          |
| 6,017,370 | A | * | 1/2000  | Manka et al. ................. 44/397 |
| 6,156,082 | A |   | 12/2000 | MacMillan et al. |

FOREIGN PATENT DOCUMENTS

| EP | 0 632 123 A1 | 1/1995  |
| EP | 0807676 A2   | 11/1997 |
| EP | 1151994 A1   | 11/2001 |
| GB | 984409       | 2/1965  |
| WO | WO 92/09673  | 6/1992  |

\* cited by examiner

*Primary Examiner*—Cephia D. Toomer
(74) *Attorney, Agent, or Firm*—Dennis H. Rainear; Paige J. Thomson; J. Clay Matthews

(57) ABSTRACT

A middle distillate fuel additive comprising the reaction product resulting from the combining of a hydrocarbyl succinic anhydride and a hydroxyamine. The lubricating properties of low sulfur-content middle distillate fuels, such as diesel, jet or bio-diesel fuels, can be significantly improved by inclusion therein of such additive compounds. The use of these middle distillate fuel additives makes it possible to avoid mechanical failure problems, such as fuel pump or injector failure, otherwise caused by inadequate fuel lubricity, while still retaining the environmental benefits of using a low sulfur fuel.

14 Claims, No Drawings

FUEL LUBRICITY ADDITIVES DERIVED FROM HYDROCARBYL SUCCINIC ANHYDRIDES AND HYDROXY AMINES, AND MIDDLE DISTILLATE FUELS CONTAINING SAME

FIELD OF THE INVENTION

The present invention relates to the use of certain compounds to improve the lubricating properties of low sulfur-content fuels and to fuels and additive concentrates comprising the compounds. More particularly, the present invention relates to compounds useful as lubricity additives for middle distillate fuels, such as diesel fuels, jet fuels and bio-diesel fuels.

BACKGROUND OF THE INVENTION

The combustion of fuels high in sulfur, for example, in conventional middle distillate fuels such as diesel fuel and jet fuel, is considered a serious environmental problem because of its contribution to airborne particulates and acid rain. Governmental regulations have been promulgated that significantly limit the amount of sulfur which may be present in such fuels. Unfortunately, fuels having a suitably low sulfur content in compliance with such regulations may exhibit very poor inherent lubricity, which can lead to problems when the fuel is used. For example, the use of low sulfur-content fuel in diesel engines frequently results in damage to fuel pumps and injectors, which rely on the natural lubricating properties of the fuel to prevent component failure. Therefore, a need has existed to improve the lubricating properties of low sulfur-content fuels to compensate for the loss in lubricating properties associated with reducing the sulfur content.

A number of prior processes have been disclosed for making additives for enhancing various performance characteristics of lubricants and/or combustion fuels in which the additives are based on the reaction products of succinic anhydrides and hydroxyamines.

U.S. Pat. No. 3,272,746 discloses succinimides of long-chain succinic anhydrides (at least 50 carbon atoms) and amines, including hydroxyamines.

U.S. Pat. No. 3,324,033 discloses the reaction product of a high molecular weight succinic anhydride and diethanolamine.

U.S. Pat. No. 3,364,001 discloses the reaction product of an alkenyl succinic anhydride (ASA) and triethanolamine and fuel compositions containing it.

U.S. Pat. No. 3,879,306 describes an automatic transmission fluid which contains a succinamic acid or a mixture of a succinamic acid and a hydroxyalkyl succinimide.

U.S. Pat. No. 4,097,389 teaches succinimides made from C8 to C300 alkenylsuccinic anhydrides and various hydroxyamines. The succinimides are post-treated with a variety of reagents to make them suitable for fuel and lubricant compositions.

U.S. Pat. No. 4,253,876 discloses corrosion inhibitors comprising triesters of an alkenyl or alkyl succinic acid or anhydride and a trialkanolamine.

U.S. Pat. No. 4,325,827 describes hydroxymethyl succinimides and engine oil compositions containing them.

U.S. Pat. No. 4,420,407 describes a lubricating oil composition comprising a mineral oil, overbased calcium sulfonate, and a succinimide made with ethanolamine.

U.S. Pat. No. 4,486,573 discloses acylated hydroxyamines.

U.S. Pat. No. 4,489,194 discloses hydrocarbyl substituted carboxylic acylating agents.

U.S. Pat. Nos. 4,997,456 and 5,122,216 teach succinimides prepared from C12–C30 alkenylsuccinic anhydrides and alkanol polyamines.

U.S. Pat. No. 5,194,068 discloses fuel compositions containing small amounts of an ester of a mono- and/or polycarboxylic acid with an alkyl alkanolamine or alkyl aminopolyalkylene glycol.

U.S. Pat. No. 6,001,141 describes a low sulfur content fuel composition containing additive compounds including a carboxylic acid substituted by a least one hydroxyl group, derivatives of the carboxylic acid substituted by at least one hydroxy group, and an ester which is the reaction product of a carboxylic acid which does not contain any hydroxy-substitution in the acid backbone and an alkanolamine.

European Patent publication EP 561947 discloses additives which are the reaction products of (1) anhydrides and/or poly-acids, and (2) aminoalcohols or amino/alcohol/amides with long chain hydrocarbyl groups attached used to improve the low-temperature properties of distillate fuels.

European Patent publication EP 632123 describes high-MW (>2000) succinimides containing hydroxyamines as effective diesel fuel dispersants.

Canadian patent publication CA 744,377 discloses succinimides made from high-MW (>700) ASAs and hydroxyamines.

United Kingdom patent publication GB 984,409 describes succinimides prepared from high-MW alkenylsuccinic anhydrides and hydroxyamines.

The disclosures of all the patents noted herein are incorporated herein by reference.

It is desired to provide a lubricity additive for low sulfur-content middle distillate fuels which can compensate for the absence of sulfur therein without impairing the environmental benefit or other desired performance features thereof.

SUMMARY OF THE INVENTION

It has now been found that the lubricating properties of low sulfur-content fuels can be improved by inclusion therein of certain additive compounds described in detail below. This makes it possible to avoid mechanical failure problems, such as fuel pump failure, otherwise caused by inadequate fuel lubricity, while still retaining the environmental benefits of using a low sulfur fuel.

In the present context the terminology "low sulfur-content fuel" is intended to mean fuels typically having a sulfur content of 0.2% by weight or less, and preferably less than 500 ppm by weight, and more preferably less than 15 ppm by weight. Examples of fuels in which the additive compounds may be used include low sulfur middle distillate fuels, such as diesel and jet fuels, and bio-diesel fuels. Middle distillate fuels are usually characterized as having a boiling range of 100 to 500° C., more typically from 150 to 400° C. Bio-diesel fuel is derived from a vegetable source or mixture thereof with a petroleum-based fuel and typically contains vegetable oils or their derivatives, such as esters produced by saponification and re-esterification or trans-esterification.

In one aspect, the present invention relates to middle distillate fuel additives, which impart excellent lubricating properties to the fuel, where the additives are derived by the reaction, combination, mixture, or admixture of a hydrocarbyl-substituted succinic anhydride and a hydroxyamine. These additives enhance the lubricating properties of the fuel without degrading other performance features of the fuel, such as detergency, ignition quality, stability, and so on. In addition, non-acidic lubricity additives posing less risk of corrosion to parts contacted by middle distillate fuels and of reaction with basic components of fuel additive formulations can be prepared in accordance with this invention.

In another aspect, the present invention relates to a method of enhancing lubricity of a diesel fuel and of reducing the wear on a diesel fuel pump used for pumping the diesel fuel, in which the lubricity additive comprising the reaction product of a hydrocarbyl succinic anhydride and a hydroxyamine has been incorporated into the diesel fuel.

The hydrocarbyl-substituted succinic anhydride is often referred to herein as an "HSA." In one aspect, the term "hydrocarbyl" group is an alkenyl or alkyl group. The term "alkenyl" means the group includes at least one carbon-carbon double bond, i.e., an unsaturation or ethylenically unsaturated covalent linkage, along a hydrocarbon chain in the group. An alkyl group contains no unsaturation. Also, for purposes herein, the term "hydroxyamine" has general meaning encompassing either monohydroxyamine or polyhydroxyamine, such as dihydroxyamine, or mixtures thereof, unless specifically indicated otherwise from the context.

It is understood that both the foregoing general description and the following detailed description are exemplary and explanatory only and are intended to provide further explanation of the present invention, as claimed.

DETAILED DESCRIPTION OF THE PREFERRED EMBODIMENTS

The present invention relates to an additive compound used to improve the lubricity of low sulfur-content fuel, in which the additive compound is the reaction product of a hydrocarbyl succinic anhydride (HSA) and a hydroxyamine. This lubricity additive compound is especially well-suited for enhancing the performance of middle distillate fuels such as diesel fuels and jet fuels, as well as bio-diesel fuel.

Hydrocarbyl Succinic Anhydride

In one aspect of the present invention, the hydrocarbyl succinic anhydride (HSA) reactant is a component represented by the following general structure I:

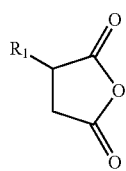

(I)

where $R_1$ is a hydrocarbyl group containing from 8 to 30 carbon atoms, and preferably from 12 to 24 carbon atoms, where $R_1$ can be straight chained, or branched, or a combination of both structures. In a preferred embodiment, $R_1$ is an aliphatic alkyl or alkenyl group containing from 8 to 30 carbon atoms. In a more preferred embodiment, $R_1$ is an aliphatic, straight alkenyl chain of 8 to 30 carbon atoms. "Straight", for purposes herein, means "unbranched". Unless indicated otherwise, the "hydrocarbyl" group can represent a hydrocarbon substituent that is aliphatic, alicyclic, aromatic, as well as cyclic substituents where the ring is completed through another portion of the molecule. The hydrocarbyl group $R_1$ also can optionally include substituents for one or more of the hydrogen atoms attached along the hydrocarbon chain as long as the desired lubrication functionality of the ultimate additive product is maintained. In one preferred embodiment, the hydrocarbyl group is non-substituted.

Examples of useful hydrocarbyl succinic anhydride compounds represented by general structure I include tridecylsuccinic anhydride, pentadecylsuccinic anhydride, tetradecenylsuccinic anhydride, hexadecenylsuccinic anhydride, dodecylsuccinic anhydride, tetradecylsuccinic anhydride, hexadecylsuccinic anhydride, octadecenylsuccinic anhydride, tetrapropylene-substituted succinic anhydride, docosenylsuccinic anhydride, and mixtures thereof.

In a further preferred embodiment, $R_1$ of structure I represents an alkenyl group of 8 to 30 carbon atoms, more particularly about 12 to about 24 carbon atoms, that is an enoic (monounsaturated) or dienoic (two unsaturations) straight hydrocarbon chain. In that instance, structure I represents an alkenyl succinic anhydride (ASA). More preferably, the HSA reactant used in preparing the lubricity additive is a single one of, or a mixture of, $C_{16}$–$C_{18}$ alkenyl succinic anhydrides. As an example, a preferred ASA component for use in the preparation of the middle distillate fuel lubricity additives of the present invention is a physical mixture or blend of hexadecenyl succinic anhydrides and octadecenyl succinic anhydrides, in all mixing ratios thereof. One exemplary commercially available blend of hexadecenyl and octadecenyl succinic anhydrides in this regard is "C1618 ASA", available from Albemarle Corp.

Among other things, the use of an HSA acylating agent that is a relatively short aliphatic alkenyl substituent group, such as defined above for $R_1$ in general structure I, in preparing the fuel additive of the present invention, in particular has been observed to provide a reaction product with hydroxyamines as described herein which imparts more than adequate fuel-solubilizing properties to the fuel additive, yet without undermining the excellent lubricity properties desired and achieved.

Reference may be had, for example, to U.S. Pat. Nos. 3,087,936; 3,163,603; 3,172,892; 3,219,666; 3,306,907; 3,346,354; 3,361,673; 3,676,089; 4,234,435; 4,997,456; 5,393,309; and 5,620,486, for synthesis procedures which may be used, or modified for use, in preparing suitable HSAs with the proviso that the materials used result in the production of an acylating agent containing an average of up to about 50 carbon atoms and having an acyclic aliphatic group, viz., an alkenyl group, of at least about 8 but less than about 30 carbon atoms. In the interest of brevity, these U.S. patents are incorporated herein by reference for their disclosure of suitable synthesis procedures which may be adapted for use in producing such acid anhydride derived acylating agents (HSAs).

U.S. Pat. Nos. 3,361,673 and 3,676,089, for example, describe techniques that can be adapted and applied for making HSAs or derivatives thereof, such as ASAs, having the above features and suitability for use in this invention involving the thermal reaction of a polyolefin and maleic anhydride. Alternatively, suitable HSAs or derivatives thereof, such as ASAs, can be prepared, for example, by adapting and applying techniques described in U.S. Pat. No. 3,172,892, for example, involving the reaction of chlorinated polyolefins with maleic anhydride.

Useful hydrocarbyl-substituted succinic acid acylating compounds generally can be prepared by reacting maleic anhydride with an olefin or a chlorinated hydrocarbon of suitable chain length such as a chlorinated polyolefin. The reaction involves merely heating the two reactants at a temperature of about 100°–300° C., preferably, 100°-200° C. The product from such a reaction is a substituted succinic anhydride, where the substituent (i.e., $R_1$ in the context herein) is derived from the olefin or chlorinated hydrocarbon. The substituted Succinic anhydrides may be hydrolyzed by treatment with water or steam to the corresponding acid and either the anhydride or the acid may be converted to the corresponding acid halide or ester by reacting with phosphorus halide, phenols, or alcohols.

The ethylenically unsaturated hydrocarbon reactant and the chlorinated hydrocarbon reactant used in the preparation of the HSA acylating agents are principally olefins, olefin oligomers, substantially saturated petroleum fractions and substantially saturated olefin oligomers and the corresponding chlorinated products. They contain an average of from 8 to below about 30 carbon atoms in the molecule. The oligomers and chlorinated oligomers derived from monoolefins having from 2 to about 4 carbon atoms are preferred. The especially useful oligomers are the oligomers of such 1-monoolefins as ethylene, propene, 1-butene, and isobutene. Oligomers of medial olefins, i.e., olefins in which the olefinic linkage is not at the terminal position, likewise are useful. These are exemplified by 2-butene. The low molecular weight interoligomers of 1-monoolefins such as illustrated above with each other and with other interoligomerizable olefinic substances are also useful sources of the ethylenically unsaturated reactant. Such interoligomers contain an average from 8 to below about 30 carbon atoms in the molecule, and include for example, those prepared by oligomerizing ethylene with propene, ethylene with isobutene, and ethylene with 1-butene, and so forth.

The chlorinated hydrocarbons and chlorinated ethylenically unsaturated hydrocarbons used in the preparation of the acylating agents also contain an average of 8 to below about 30 carbon atoms in the molecule. The preferred reactants are the above-described olefins and chlorinated olefins containing an average of at least 16 carbon atoms, preferably about 16 to about 28 carbon atoms.

As an important aspect of the present invention, the reaction, combination, admixture or bringing together of an HSA and a hydroxyamine results in an acylated hydroxyamine compound useful as a middle distillate fuel lubricity additive in low sulfur-content middle distillate fuel. The acylated hydroxyamine additive compounds of the present invention are prepared by reacting a hydroxyamine with an HSA in a suitable reaction media. Suitable reaction media include, but are not limited to, organic solvents, such as toluene, or process oil. Water may be a by-product of this reaction. The use of toluene allows for azeotropic removal of such water via distillation. A discussion of suitable hydroxyamine reactants for this purpose is set forth below.

Hydroxyamines

Suitable hydroxyamine reactants have the following general structure II:

(II)

where $R_2$ may be a hydrogen atom, a hydrocarbyl group, or a mono- or polyhydroxy-substituted hydrocarbyl group, and Z is an alkylene or arylalkylene group containing from 2 to 12 carbon atoms, and X is a hydrogen atom, a hydrocarbyl group or a mono- or polyhydroxy-substituted hydrocarbyl group bonded to any of the carbon atoms in Z. Thus, where $R_2$ represents a hydrogen atom, the above general structure II represents a primary alkanol amine. Where $R_2$ instead represents a non-substituted or hydroxy-substituted hydrocarbyl group, the general structure II represents a secondary alkanol amine. To the extent $R_2$ or X represents a hydrocarbyl group or a mono- or polyhydroxy-substituted hydrocarbyl group, it generally contains from 1 to 12 carbon atoms.

Non-limiting examples of hydroxyamines according to general structure II include ethanolamine, diethanolamine, N-alkylethanolamines, N-alkenylethanolamines, N-alkylisopropanolamines, N-alkenylisopropanolamines, isopropanolamine, diisopropanolamine, tris(hydroxymethyl)aminomethane, 3-amino-1,2-propanediol, 2-amino-1,3-propanediol, and mixtures thereof, where the alkyl and alkenyl groups, when present, contain 1 to 12 carbon atoms. Other hydroxyamines useful in the present invention include 3-amino-1-propanol, 4-amino-1-butanol, 5-amino-1-pentanol, 6-amino-1-hexanol, 4-aminophenol, their isomers, and mixtures thereof.

Also, another group of hydroxyamines useful in the present invention have the hydroxyl group directly bonded to the nitrogen, i.e., the above-shown general structure II of the hydroxyamine can optionally represent a compound the same as shown except that it lacks the —Z(X)— moiety. Thus, also useful in the present invention are hydroxylamine, and N-alkylhydroxyamines or N-alkenylhydroxyamines where the alkyl or alkenyl group may contain up to 12 carbon atoms.

Also useful in the present invention are HSA-hydroxyamine compounds in which the free hydroxyl group has been allowed to react with epoxides such as ethylene oxide, propylene oxide, butylene oxide, glycidol, and the like.

The molar ratio of hydrocarbyl-substituted succinic anhydride acylating agent to hydroxyamine can be from about 1:4 to about 4:1, and more preferably is from about 1:2 to about 2:1.

By "reacting" or "reaction product" herein is meant any product, material, compound, or mixture resulting from the combination, mixing, or otherwise bringing together of a hydrocarbyl-substituted succinic anhydride acylating agent and a hydroxyamine and/or dihydroxyamine. This can include a covalently bonded reaction product, an ionically bonded reaction product such as a salt, a mixture of materials, and/or a precursor or in situ reaction product.

The reaction product of the present invention can be produced by combining at ambient or elevated temperatures the appropriate quantities of the hydrocarbyl-substituted succinic anhydride acylating agent and the hydroxyamine with mixing for a sufficient time with or without a reaction medium such as a solvent or a base oil.

An advantage of using a hydroxyamine reactant that is a primary amine in the making of the fuel additive is that the direct reaction product obtained with the HSA is a non-acidic material. Non-acidic fuel additives are desirable as they are less corrosive additives; they also do not undergo neutralization reactions with basic fuel components such as dispersants or detergents. Where secondary or tertiary amines are used as the hydroxyamine ingredient, the initial reaction product obtained between the hydroxyamine and HSA optionally can be neutralized (e.g., with an amine), or permitted to react with an alcohol (esterification) or an amine (amidation), including another hydroxyamine, to provide a non-acidic additive product.

The present invention further provides a low sulfur fuel comprising a lubricity enhancing additive as hereinabove described. Such fuels are formulated by simple mixing of a base fuel and the additive in the desired proportions. The base fuel may be a middle distillate fuel or a bio-diesel fuel as described above. Typically, the concentration of the lubricity enhancing additive used in a middle distillate fuel falls in the range 10 to 1000 ppm, preferably 10 to 500 ppm, and more preferably from 25 to 250 ppm. When mixtures of additives are used the overall additive concentration falls within the typical range noted.

For the sake of convenience, the additive may be provided as a concentrate for dilution with fuel. Such a concentrate forms part of the present invention and typically comprises from 99 to 1% by weight additive and from 1 to 99% by weight of solvent or diluent for the additive which solvent or diluent is miscible and/or capable of dissolving in the fuel in which the concentrate is to be used. The solvent or diluent may, of course, be the low sulfur fuel itself. However, examples of other solvents or diluents include white spirit, kerosene, alcohols (e.g., 2-ethyl hexanol, isopropanol and isodecanol), high boiling point aromatic solvents (e.g., toluene, xylene) and cetane improvers (e.g., 2-ethyl hexylnitrate). Of course, these may be used alone or as mixtures.

The concentrate or fuel may also contain other fuel additives in the appropriate proportions thereby providing a multifunctional fuel additive package. Examples of conventional fuel additives which may be used include antioxidants, fuel stabilizers, dispersants, antihaze agents, detergents, antifoams, cold flow improvers, cetane number improvers, ignition and combustion improvers, corrosion inhibitors, antistatic additives, biocides, dyes, smoke reducers, catalyst life enhancers and demulsifiers, and other standard or useful fuel additives. These other additives can be included to the extent that they are compatible with the lubricity-enhancing additives and desired effects thereof according to the present invention. The total treat rate for multifunctional formulations containing the lubricity enhancing additive compounds described is typically 100 to 2000 ppm.

The fuel additive compounds of the present invention are especially useful in low sulfur-content middle distillate fuels, including diesel and jet fuels, to improve the lubricity of the fuel when pumped through various fuel handling devices, engines and machines. This increased lubricity can be manifested as reduced friction and/or wear in mechanical parts contacted by the fuel. In addition, the additives of the present invention have the added advantage of being non-acidic which is desirable in reducing the corrosive nature of diesel fuels, which have had additives incorporated therein.

A diesel fuel according to one specific embodiment of this invention comprises a major amount of a middle distillate fuel, and a minor amount of the additive comprising the reaction product of a hydrocarbyl succinic anhydride acylating agent and a hydroxyamnie. The term "major amount" as used herein generally means a predominant amount, while a "minor amount" refers to an amount less than a major amount as defined herein.

In a particular aspect thereof, the invention provides a method of reducing fuel pump and injector wear in an engine which operates on a low sulfur-content fuel by using the low sulfur-content fuel described herein. For instance, the fuel may be used to reduce wear in rotary and in-line fuel pumps, for example, as found in diesel engines, or in fuel transfer pumps. The latter are positioned between the fuel tank and the high pressure pump. The fuel is particularly well suited for reducing wear in fuel pumps and injectors. The fuel may also be used in the latest generation unit injectors, which combine pump and injector mechanisms. The invention is particularly well-suited to the operation of diesel and jet engines.

As demonstrated in examples provided herein, additives of the present invention that are prepared and blended with low sulfur-content middle distillate fuels impart improved lubricity thereto. In particular, performance tests of middle distillate fuels obtained from such combinations, in which such performance tests are conducted using a HFRR (High Frequency Reciprocating Rig, ASTM D6079) or a Scuffing Load BOCLE (Ball-on-Cylinder Lubricity Evaluator, ASTM D6078), have demonstrated the achievement of surprising enhancements in lubricity. The present invention is further illustrated by the following non-limiting examples.

EXAMPLES

Example 1

In a typical synthesis, 79 g (0.24 mol) of C1618 ASA (a mixture of hexadecenyl succinic anhydride and octadecenyl succinic anhydride) was dissolved in 150 mL of toluene in a 3-neck round-bottom flask fitted with a mechanical stirrer and a Dean-Stark distillation trap. Ethanolamine (15 g, 0.24 mol) was added. The resulting solution was refluxed at 108–116° C. for 4 hours. Water (4.4 mL) was collected by azeotropic distillation. The toluene was then removed by vacuum distillation, leaving 87 g of 1:1 $C_{16-18}$ ASA:EA succinimide product.

Example 2

Fuel samples 1–3 were prepared consisting of 150 ppm (v/v) of a test additive, identified in Table 1 below, in a base fuel. The base fuel was Swedish Class I diesel fuel. The composition of the additive used is indicated and the mixing ratio (mole:mole basis) used for the hydrocarbyl-substituted succinic anhydride (HSA) and hydroxyamine components thereof. The fuel samples were subjected to HFRR lubricity testing. A separate comparison test C1 was run using the Swedish Class I diesel base fuel without inclusion of a lubricity additive. The results for these tested fuel samples are reported as mean wear scar diameter ("MWSD"), in units of microns. A decrease in MWSD indicates an increase in the lubricity of the fuel.

TABLE 1

| Fuel sample | Additive Composition | MWSD (microns) |
|---|---|---|
| 1 | 1:1 $C_{16-18}$ASA:APD | 396 |
| 2 | 1:1 $C_{16-18}$ASA:THAM | 637 |
| 3 | 1:1 $C_{16-18}$ASA:EA | 376 |
| C1 | None | 650 |

Abbreviations:

$C_{16-18}$ ASA=mixture of hexadecenyl succinic anhydride and octadecenyl succinic anhydride APD=3-amino-1,2-propanediol THAM=tris(hydroxymethyl)aminomethane EA=ethanolamine The above results of this experiment illustrate the diesel fuel samples containing HSA-hydroxyamine additives according to the present invention provided significant improvement in wear scar diameter relative to the comparison diesel fuel sample lacking such an additive.

Example 3

Fuel samples 4–8 were prepared containing 100 ppm (w/w) of a test additive identified in Table 2 below, admixed with a base fuel. The base fuel was Jet A fuel. The composition of the additive used is indicated and the mixing ratio (mole:mole basis) used for the hydrocarbyl-substituted Succinic anhydride (HSA) and hydroxyamine components thereof. The fuel samples were subjected to scuffing load BOCLE testing. Separate comparison tests C2 and C3 also were run using the Jet A base fuel without inclusion of a lubricity additive. The BOCLE scuff load, in grams (g), was measured for each fuel. An increase in scuff load indicates an increase in the lubricity of the fuel.

TABLE 2

| Fuel sample | Additive Composition | BOCLE scuff load (g) |
|---|---|---|
| 4 | 1:1 $C_{16-18}$ASA:DEA | 2200 |
| 5 | 1:1 $C_{16-18}$ASA:EA | 2000 |
| 6 | 1:1:1 $C_{16-18}$ASA:DEA:EA | 2400 |
| 7 | 1:1 $C_{16-18}$ASA:APD | 3000 |
| 8 | 1:1 $C_{16-18}$ASA:THAM | 1800 |
| C2 | None | 1200 |
| C3 | None | 1400 |

Abbreviations:

$C_{16-18}$ ASA=mixture of hexadecenyl succinic anhydride and octadecenyl succinic anhydride DEA=diethanolamine EA=ethanolamine THAM=tris(hydroxymethyl)aminomethane APD=3-amino-1,2-propanediol The above results of this experiment illustrate the jet fuel samples containing HSA-hydroxyamine additives according to the present invention provided significant improvement in scuff resistance relative to the comparison jet fuel sample lacking such an additive.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A low sulfur-content fuel composition comprising a low sulfur-content middle distillate fuel and an additive comprising the reaction product resulting from the combining of a substituted hydrocarbyl succinic anhydride and 3-amino-1,2-propanediol, wherein the hydrocarbyl group that is substituted on the succinic anhydride is a branched or a mixture of straight and branched hydrocarbyl groups having 8 to 24 carbon atoms.

2. The fuel composition of claim 1, wherein the middle distillate fuel is selected from diesel fuel, jet fuel or biodiesel fuel.

3. The fuel composition of claim 1, wherein the sulfur content of the fuel composition is no more than 500 ppm.

4. The fuel composition of claim 1, wherein the additive compound is present in the fuel composition in an amount of 10 to 1000 ppm.

5. A middle distillate fuel composition comprising a major amount of a low sulfur-content middle distillate fuel comprising a sulfur content of less than 0.2% by weight or less, and a minor amount of an additive comprising the reaction product of a hydrocarbyl succinic anhydride and 3-amino-1,2-propanediol, wherein the hydrocarbyl group that is substituted on the succinic anhydride is a branched or mixture of straight and branched hydrocarbyl groups having 8 to 24 carbon atoms.

6. A The fuel composition comprising a major amount of a low sulfur-content middle distillate fuel comprising a sulfur content of less than 0.2% by weight or less, and a minor amount of an additive comprising the reaction product of a hydrocarbyl succinic anhydride and 3-amino- 1,2-propanediol, wherein the hydrocarbyl succinic anydride comprises a mixture of hexadecenyl succinic anhydride and octadecenyl succinic anhydride.

7. The fuel composition of claim 5, wherein the hydrocarbyl group is monounsaturated.

8. The middle distillate fuel composition of claim 5, wherein the middle distillate fuel has a maximum sulfur content of 500 ppm by weight.

9. The middle distillate fuel composition of claim 5, wherein additive is present in the fuel composition in an amount of 10 to 1000 ppm by weight.

10. The middle distillate fuel composition of claim 5, wherein additive is present in an amount of 25 to 250 ppm by weight.

11. The middle distillate fuel composition of claim 5, wherein the middle distillate fuel comprises diesel fuel.

12. The middle distillate fuel composition of claim 5, wherein the additive is non-acidic.

13. A method of reducing wear on a middle distillate fuel pump pumping middle distillate fuel, said method comprising adding to the middle distillate fuel a minor amount of an additive comprising the reaction product resulting from the combining of a substituted hydrocarbyl succinic anhydride and 3-amino-1,2-propanediol, wherein the hydrocarbyl group that is substituted on the succinic anhydride is a branched or a mixture of straight and branched hydrocarbyl groups having 8 to 24 carbon atoms.

14. A method of improving the lubricity of a middle distillate fuel, said method comprising adding to the middle distillate fuel a minor amount of an additive comprising the reaction product resulting from the combining of a substituted hydrocarbyl succinic anhydride and 3-amino-1,2-propanediol, wherein the hydrocarbyl group that is substituted on the succinic anhydride is a branched or mixture of straight and branched hydrocarbyl groups having 8 to 24 carbon atoms.

* * * * *

UNITED STATES PATENT AND TRADEMARK OFFICE
CERTIFICATE OF CORRECTION

PATENT NO. : 7,182,795 B2 Page 1 of 1
APPLICATION NO. : 10/096538
DATED : February 27, 2007
INVENTOR(S) : Timothy J. Henly et al.

It is certified that error appears in the above-identified patent and that said Letters Patent is hereby corrected as shown below:

On the Title page, Assignee name is misspelled ("Atton"). The information for Assignee should read:

--(73) Assignee: Afton Chemical Intangibles LLC, Richmond, VA (US)--

Signed and Sealed this

Thirty-first Day of July, 2007

JON W. DUDAS
*Director of the United States Patent and Trademark Office*